Patented July 26, 1927.

1,636,860

UNITED STATES PATENT OFFICE.

KARL FRIEDRICH, OF BRESLAU, GERMANY.

METHOD FOR THE PRODUCTION OF A COLD GLAZE UPON BUILDING MATERIAL, SUCH AS CONCRETE, SANDSTONE, CLAY, BRICKWORK, AND THE LIKE.

No Drawing. Application filed October 8, 1921. Serial No. 506,365.

By Patent No. 1,402,412 granted January 3, 1922, a process for the production of cold glaze on building materials, such as concrete, sandstone, clay, brickwork and the like has become known consisting in mixing a finely sifted cement material with an emulsion of aqueous bituminous substances free of volatile oils and oxidized in the presence of alkalies.

Substances, which correspond to these conditions have been used for some time in building constructions for making waterproof mortar, concrete and the like and in order to prevent the exuding of saltlike compounds upon the surface.

It has now been found that not only the bituminous substances treated in the manner set forth in Patent 1,402,412 are capable of making the glaze appear rapidly and in perfect condition by adding the glazing composition to a mass consisting of cement or similar material finely distributed in water but also other water repelling substances which, as addition to the solid ingredients mentioned in said patent, serve for the purpose of making concrete and brickwork water-proof.

The improvement over the method described and claimed in the above mentioned prior patent is that a large number of substances is available of which that substance can be selected which is actually the cheapest, and the invention consists in substituting for the aqueous bituminous substances free of volatile oils and oxidized in the presence of alkalies as defined in the prior Patent No. 1,402,412, any of the following substances used for rendering concrete and brickwork water-proof and which may be divided into two groups. The first group comprises substances which are impermeable to water and which communicate this character to the whole mass of concrete or brickwork by being finely distributed in the mortar or in the concrete. To this group belong essentially bituminous substances, waxlike or resinous substances and the like. The second group consists of substances which, in order to be transformed into compounds not soluble in water, have to be admixed either prior to their application or prior to the drying, with lime, magnesia or the like. These substances are most of a soaplike character. Such substances which have become known are, for instance, ammoniacal zinc solutions and soaps or alkaline or ammoniacal-solutions of the hydroxides or copper, lead, tin, chromium, aluminium and the like in conjunction with soap, or pasty masses which are obtained by addition of calcium suboleate with aluminium sulphate solutions.

The effect of these substances is to cause the formation of water-proof metallic soaps which fix the glaze that forms immediately upon application of the glazing composition, and prevent the dulling or disappearance of the glaze upon setting, drying or solidifying. This is the same effect which is produced by bitumen.

*Example.*

Zinc soap is converted under heating into a colloidal solution by means of ammoniacal water and this solution is diluted with a quantity of water ten times the quantity of solution used. A quantity of finely sifted Portland cement approximately equal to one third of the quantity by weight of the diluted solution is added to the diluted solution and stirred so that a thin paste is formed which by means of a squirting apparatus is used for coating the surface to be glazed. After the concrete has bound and solidified a bright absolutely continuous surface free of pores will appear on the object treated, this coating being similar to a glaze produced on ceramic articles when they are glazed under heat.

I claim:—

A method for producing in the cold state a permanent thin glaze-like coating on building material consisting in preparing a mixture of cement, water and an emulsion of zinc soap, and in painting the building material with a thin coating of this liquid.

In testimony whereof I affix my signature.

KARL FRIEDRICH.